United States Patent [19]
Knuth et al.

[11] Patent Number: 5,781,613
[45] Date of Patent: Jul. 14, 1998

[54] TELEPHONE ANSWERING DEVICE AND METHOD FOR SCREENING INCOMING TELEPHONE CALLS WITH BLOCKED CALLING PARTY IDENTIFICATION INFORMATION

[75] Inventors: Stephen B. Knuth, Mission Viejo; Mark J. Karnowski, Huntington Beach. both of Calif.

[73] Assignee: Casio PhoneMate, Inc., Torrance, Calif.

[21] Appl. No.: 664,528

[22] Filed: Jun. 17, 1996

[51] Int. Cl.$^6$ .................................................. H04M 1/56
[52] U.S. Cl. .................... 379/67; 379/142; 379/373; 379/82; 379/88
[58] Field of Search ..................... 379/67, 68, 70, 379/74, 77, 81, 82, 87, 88, 142, 373

[56] References Cited

U.S. PATENT DOCUMENTS

| | | | |
|---|---|---|---|
| 4,266,098 | 5/1981 | Novak | 379/142 |
| 5,228,080 | 7/1993 | Nutter et al. | 379/373 |
| 5,313,516 | 5/1994 | Afshar | 379/67 |
| 5,341,411 | 8/1994 | Hashimoto | 379/67 |
| 5,351,289 | 9/1994 | Logsdon et al. | 379/142 |
| 5,400,393 | 3/1995 | Knuth et al. | 379/88 |
| 5,604,791 | 2/1997 | Lee | 379/67 |
| 5,644,629 | 7/1997 | Chow | 379/142 |

FOREIGN PATENT DOCUMENTS

| | | |
|---|---|---|
| 437 256 A2 | 7/1991 | European Pat. Off. |
| 439 927 A2 | 8/1991 | European Pat. Off. |
| 2 251 157 | 6/1992 | United Kingdom |

*Primary Examiner*—Daniel S. Hunter
*Attorney, Agent, or Firm*—Frishauf, Holtz, Goodman, Langer & Chick

[57] ABSTRACT

A telephone answering device includes a line interface for connecting the telephone answering device to a telephone line and a ring detector, coupled to the telephone line, for detecting ringing signals sent from a telephone company central office. A calling party identification (CPID) detector, coupled to the telephone line, is provided for detecting CPID information. A controller controls the line interface to seize the telephone line immediately after the ring detector detects a first ring on the telephone line and the CPID detector detects that the CPID information is blocked. After the line interface seizes the telephone line, the telephone answering device plays an outgoing message to the caller and, thereafter, the caller may record a message for the telephone answering device owner. If the telephone answering device owner is present at the time of the call, he or she may simultaneously listen while the caller is leaving a message and determine the caller's identity despite the blocked CPID information. If the CPID detector detects that the CPID information is not blocked, the controller controls the line interface to seize the telephone line only after a predetermined number of rings occurs with no answer. Two outgoing messages may be provided; one for use when the CPID information is blocked and another for use when the CPID information is not blocked.

19 Claims, 4 Drawing Sheets

NOTE: Dotted area could be a digital answering machine subsystem on a single chip.

NOTE: Dotted area could be a digital answering machine subsystem on a single chip.

5,781,613

TELEPHONE ANSWERING DEVICE AND METHOD FOR SCREENING INCOMING TELEPHONE CALLS WITH BLOCKED CALLING PARTY IDENTIFICATION INFORMATION

BACKGROUND OF THE INVENTION

This invention relates to telephone answering devices with calling party identification detection capability, and more particularly to telephone answering devices that allow a user to screen incoming telephone calls with blocked calling party identification information.

Calling Party Identification (CPID) services are available to many telephone customers throughout the United States. Generally, the telephone customer will purchase a device that receives CPID signals from the telephone company's central office pertaining to a caller's telephone number. This telephone number is displayed so that the called party can identify the caller and decide whether or not to take the call. Many telephone companies also offer a service whereby subscribers can keep their CPID information private and block such information from being transmitted to all or to selected called parties. When a call, for which the CPID information is blocked, is made to a party who subscribes to a CPID service, the called party's CPID device will display words, such as "CALL BLOCKED", instead of the caller's telephone number. Such CPID blocking services pose a problem for called parties who subscribe to CPID services because a called party cannot identify a caller who has blocked transmittal of his or her CPID information (which defeats the purpose of subscribing to a CPID service). In such a case, the called party must decide whether to answer the call, let a telephone answering device answer the call or let the call go unanswered. If the called party decides to answer the call despite the blocked CPID information, he or she may end up taking an unwanted call (such as from a sales person, telemarketer or prank caller). If the called party decides to let a telephone answering device (TAD) answer the call, he or she can discover the identity of the caller (that is he or she can screen the call) when the caller records his or her message. Unfortunately, the called party will have to wait until after the TAD seizes the telephone line which could take three or four rings. It would be desirable for a person who subscribes to a CPID service to be able to screen calls from those callers who have their CPID information blocked and be able to do so in a timely manner.

Methods of handling calls with blocked CPID information are known in the art. U.S. Pat. No. 5,228,080 to Nutter et al. describes an apparatus that will automatically prevent a user's telephone from ringing when a call with blocked CPID information is received. While Nutter et al. prevents those callers who purposely block their CPID information from getting through, this apparatus does not allow the called party to screen his or her calls and then make a decision as to whether or not to answer the call.

U.S. Pat No. 5,341,411 to Hashimoto describes a method whereby a called party's telephone set is automatically disconnected from the telephone line after one ring if the device cannot detect CPID information (due to the calling party blocking his or her CPID information). Hashimoto discloses that the ring signal can still activate a telephone answering device. However, even though the telephone set stops ringing after one ring, the TAD will still take three rings before it seizes the telephone line (see column 4, lines 14–17). A user of the Hashimoto device will be inconvenienced by having to wait that period of time before being able to screen the call.

SUMMARY OF THE INVENTION

Accordingly, it is an object of the present invention to provide a telephone answering device with calling party identification detection capability that allows a local user to screen telephone calls from callers who purposely block transmittal of their calling party identification (CPID) information.

It is another object of the present invention to provide a telephone answering device that seizes the telephone line after only one ring if detection of the calling party identification (CPID) information is blocked by the caller, thereby allowing the local user to screen the telephone call in a timely manner.

It is still another object of the present invention to provide a telephone answering device that waits to seize the telephone line after a predetermined number rings if the calling party identification information is not blocked, thereby indicating to a local user that the calling party identification information is not blocked and allowing the local user enough time to answer the call.

It is yet another object of the present invention to provide two different outgoing messages; one outgoing message to be played when the calling party identification information is not blocked and a second outgoing message to be played when the calling party identification information is blocked.

In accordance with a first embodiment of the present invention, a tape-based telephone answering device includes a line interface for connecting the telephone answering device to a telephone line, a ring detector, coupled to the telephone line, for detecting ringing signals on the telephone line and a message recording and playback unit, coupled to the line interface, for recording and playing back a message. A calling party identification detector is coupled to the telephone line for detecting calling party identification information. A controller, coupled to at least the message recording and playback unit and to the calling party identification detector, is provided for controlling the message recording and playback unit and for monitoring the calling party identification detector. A display, coupled to the controller, is provided for displaying at least calling party identification information.

In accordance with a second embodiment of the present invention, a digital telephone answering device includes a line interface for connecting the telephone answering device to a telephone line, a ring detector, coupled to the telephone line, for detecting ringing signals on the telephone line and a speech digitizer, coupled to the line interface, for digitizing voice messages. A calling party identification detector, coupled to the telephone line, is provided for detecting calling party identification information, and a memory, coupled to the speech digitizer, is provided for storing digitized voice messages. A controller, coupled to at least the calling party identification detector, the speech digitizer, and the memory is provided for monitoring the calling party identification detector and for controlling the speech digitizer and the memory to record a voice message. A display, coupled to the controller, is provided for displaying at least calling party identification information.

A remote detector, coupled to the line interface and to the controller, may be provided in accordance with either embodiment for detecting a remote code entered by a user, wherein upon detection of the remote code entered by the user, the controller causes play back of recorded voice messages.

The above and other objects, features and advantages of the invention will become readily apparent from the following detailed description which is to be read in conjunction with the accompanying drawings.

DETAILED DESCRIPTION

Figure 1:
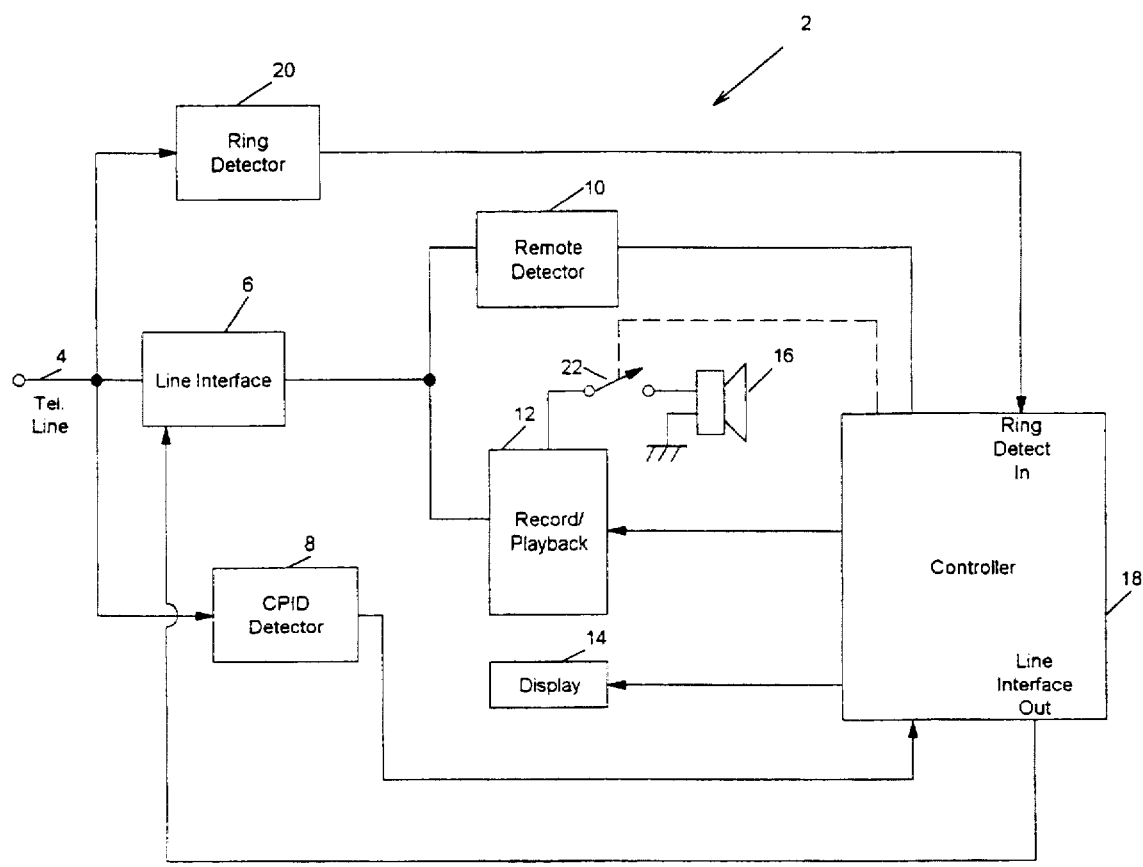
FIG. 1 is a generalized block diagram of a tape-based telephone answering device in accordance with one embodiment of the present invention.

The present invention provides a calling party identification (CPID) function in a telephone answering device (TAD) and allows a local user to screen calls from callers who have their calling party identification (CPID) information blocked. The TAD of the present invention seizes the telephone line after one ring if the CPID information is blocked, thereby allowing the local user to screen the call in a short period of time. If the CPID information is not blocked, the TAD of the present invention waits to seize the telephone line for a predetermined number of rings (for example, four). This indicates to the local user that the CPID information is not blocked and allows the local user enough time to look at the displayed CPID information and answer the call (if he or she so chooses). One arrangement of the present invention plays the same outgoing message to a caller regardless of whether the calling party identification information is blocked or not. A second arrangement of the present invention provides two different outgoing messages; a regular outgoing message to be played when the calling party identification information is not blocked and a special outgoing message to be played when the calling party identification information is blocked.

The TAD of the present invention operates in a similar manner to a standard TAD. When the TAD of the present invention goes unanswered after a predetermined number of rings (for valid or received CPID information) or after one ring (for blocked CPID information), a line interface seizes the telephone line and an outgoing message (OGM) is played to the caller. The OGM (or OGMs in the case of the second arrangement) can be recorded on a tape mechanism or stored digitally in memory. In the case of the second arrangement, the special OGM to be played in response to blocked calling party identification information can be a prerecorded message provided by the factory. After the caller has listened to the OGM and hears a tone indicating that message recording can begin, he or she records a message for the owner of the TAD. After the caller hangs up, the TAD resets itself in order to take the next call. The owner of the TAD can then retrieve his or her messages either directly from the device itself or from a remote location by entering a dual tone multi-frequency (DTMF) security code.

If the owner of the TAD according to the present invention is present when the telephone call is received, he or she can screen the call by looking at a display showing the caller's CPID information. If he or she chooses not to take the call, the TAD of the present invention will seize the telephone line after a predetermined number of rings and play the appropriate OGM to the caller as described above.

If the caller has purposely blocked transmittal of his or her CPID information, the display of the TAD will show the words "CALL BLOCKED", for example, instead of the caller's telephone number. In a such a case, the TAD of the present invention will seize the telephone line after one ring and play the OGM (or the special OGM in the case of the second arrangement) to the caller as described above. A possible special OGM for calls with blocked CPID information would be "I do not answer calls with blocked caller ID, please leave a message at the tone." In this manner, the owner of the TAD according to the present invention will be aware that he or she is receiving a call with blocked CPID information and can instantly screen the call by simultaneously listening as the caller records his or her message.

Referring to the drawings in detail, and initially to FIG. 1 thereof, there is shown a block diagram of a tape-based telephone answering device 2 according to one embodiment of the present invention. As shown in FIG. 1, a line interface 6 connects telephone answering device 2 to a telephone line 4. A ring detector 20 is also coupled to the telephone line 4 and monitors the telephone line 4 for detection of ringing signals sent from a telephone company central office. Line interface 6 and ring detector 20 are similar to the line interface and ring detector disclosed in U.S. Pat. No. 5,101, 426 which issued on Mar. 31, 1992 and is assigned to the same assignee as the present application. The entire contents of U.S. Pat. No. 5,101,426 are incorporated herein by reference. When a ring occurs, a calling party identification (CPID) detector 8, also coupled to telephone line 4, detects CPID information, that is, at least the caller's telephone number. If the CPID information is valid (that is, it is not blocked), the caller's telephone number is displayed on display 14. If the CPID information is blocked, the words "CALL BLOCKED", for example, are displayed on display 14. Calling party identification detector 8 and display 14 are coupled to a controller 18 which is also coupled (via other elements) to line interface 6. Display 14 is preferably an LCD display.

A remote detector 10 is coupled to line interface 6 and to controller 18 and detects at least a dual tone multifrequency (DTMF) code entered by a user from a remote location. Upon detection of the remote DTMF code, controller 18 causes record/playback unit 12 to play back recorded voice messages to the user. Remote detector 10 is similar to the remote detection circuit 34 disclosed in U.S. Pat. No. 5,313,516 which issued on May 17, 1994 and is assigned to the same Assignee as the present application. The entire contents of U.S. Pat. No. 5,313,516 are incorporated herein by reference.

When a call is received on telephone line 4 and the CPID information is blocked, the line interface 6 seizes telephone line 4, under control of controller 18, after the first ring occurs (as detected by the ring detector 20). Thereafter, a record/playback unit 12, coupled to telephone line 4 through line interface 6, plays an OGM to telephone line 4 requesting that the caller leave a message (or plays a special OGM indicating that the call will not be answered due to caller ID blocking). The caller then records his or her message on record/playback unit 12. Record/playback unit 12 also has an input coupled to controller 18 and an output coupled to loudspeaker 16 through a switch 22 which is controlled by controller 18.

When a call is received and the CPID information is valid (that is it is not blocked), the line interface 6 seizes the telephone line 4, under control of controller 18, after a predetermined number of rings occurs (as detected by ring detector 20) with no answer. Thereafter, record/playback unit 12 plays the OGM (or a regular OGM) to telephone line 4 (through line interface 6) and the caller leaves a message as described above.

Figure 2:
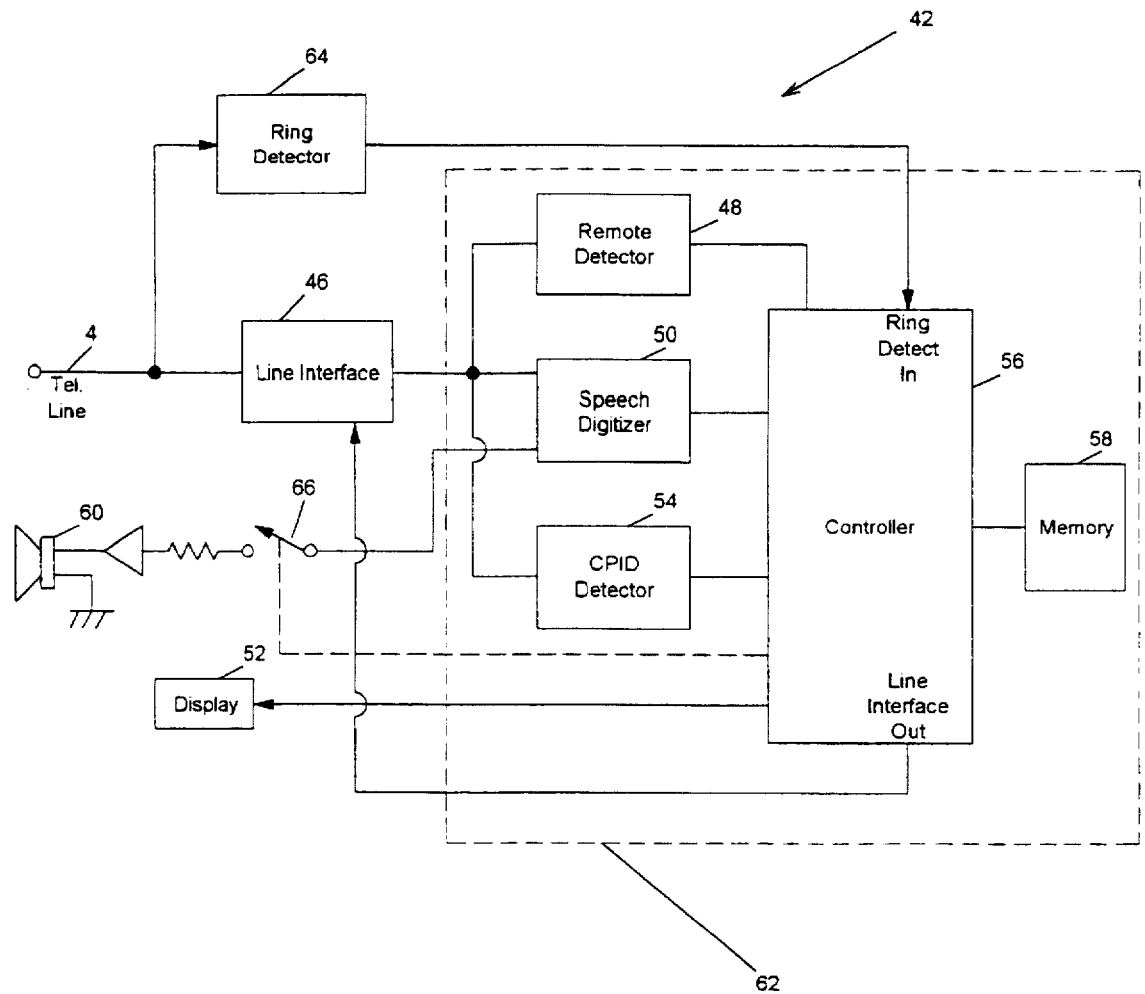
FIG. 2 is a generalized block diagram of a digital telephone answering device in accordance with a second embodiment of the present invention.

FIG. 2 is a block diagram showing a digital telephone answering device 42 according to a second embodiment of the present invention. The line interface 46, ring detector 64, calling party identification (CPID) detector 54, remote detector 48 and display 52 all operate under control of controller 56 in the same way as described above with relation to line interface 6, ring detector 20, calling party identification (CPID) detector 8, remote detection 10 and display 14 of the tape-based telephone answering device 2 shown in FIG. 1. In the digital telephone answering device (TAD) 42, however, the voice messages of TAD 42 are digitized by a speech digitizer 50 and stored in memory 58 rather than on tape. Speech digitizer 50 is coupled to controller 56 and has an output coupled to speaker 60 through a switch 66 which is controlled by controller 56. Display 52 is preferably an LCD display. For simplification and cost savings, speech digitizer 50, calling party identification detector 54, controller 56, memory 58 and remote detector 48 can be integrated on a single chip 62. The memory 58 is preferably a random access memory, such as the random access memory disclosed in U.S. Pat. No. 5,400,393 which issued on Mar. 21, 1995 and is assigned to the same assignee as the present application. The entire contents of U.S. Pat. No. 5,400,393 are incorporated herein by reference.

Figure 3:
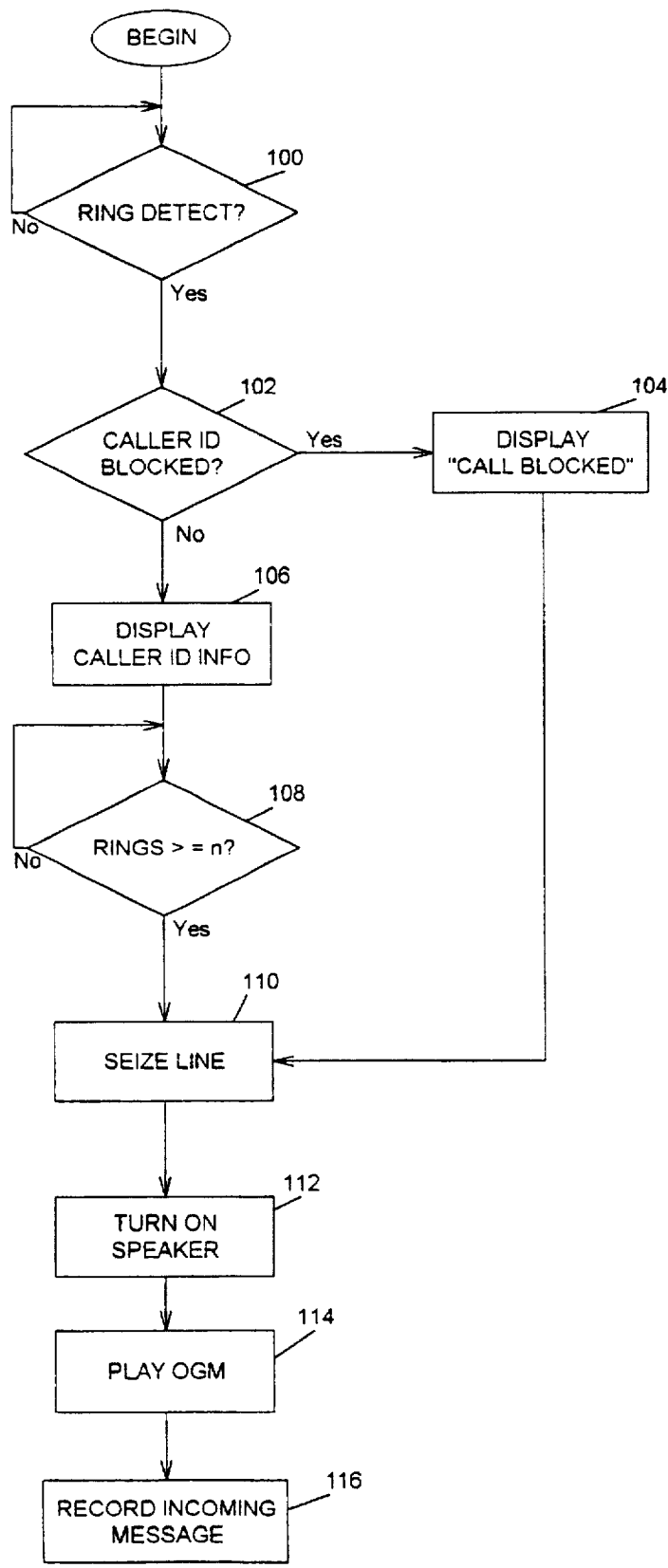
FIG. 3 is a flow diagram showing the procedure for handling telephone calls with blocked calling party identification information in accordance with one arrangement of the present invention.

FIG. 3 is a flow diagram showing the procedure algorithm used by the controller of both embodiments for dealing with incoming telephone calls in accordance with one arrangement of the present invention. In step 100, the controller (18 of FIG. 1 or 56 of FIG. 2) first checks to see if a ring has been detected by the ring detector (20 of FIG. 1 or 64 of FIG. 2). If a ring has not been detected (No in step 100), the controller returns to step 100 and continues to check for incoming ringing signals. If a ring has been detected (Yes in step 100), the controller checks the calling party identification detector (8 of FIG. 1 or 54 of FIG. 2) to see if the CPID information is blocked (step 102). If the CPID information is blocked (Yes in step 102), the words "CALL BLOCKED" are displayed on the display (step 104). The TAD then seizes the telephone line (step 110), turns on the speaker by closing the switch in series with the speaker (step 112), plays the outgoing message (OGM) to the telephone line (step 114) and records the caller's incoming message (step 116). After the TAD seizes the telephone line in step 110, the operation of the TAD is conventional.

If the CPID information is not blocked (No in step 102), the caller's CPID information is displayed on the display (step 106) and the controller checks the ring detector (20 of FIG. 1 or 64 of FIG. 2) to see if the number of rings received is equal to or greater than a predetermined number "n"(step 108). If the number of rings received is less than the predetermined number "n"(No in step 108), the controller returns to step 108 and continues to monitor the ring detector. When the number of rings received is equal to or greater than the predetermined number "n" (Yes in step 108), the TAD seizes the telephone line (step 110), turns on the speaker (step 112), plays the outgoing message (OGM) to the telephone line (step 114) and records the caller's incoming message (step 116).

Figure 4:
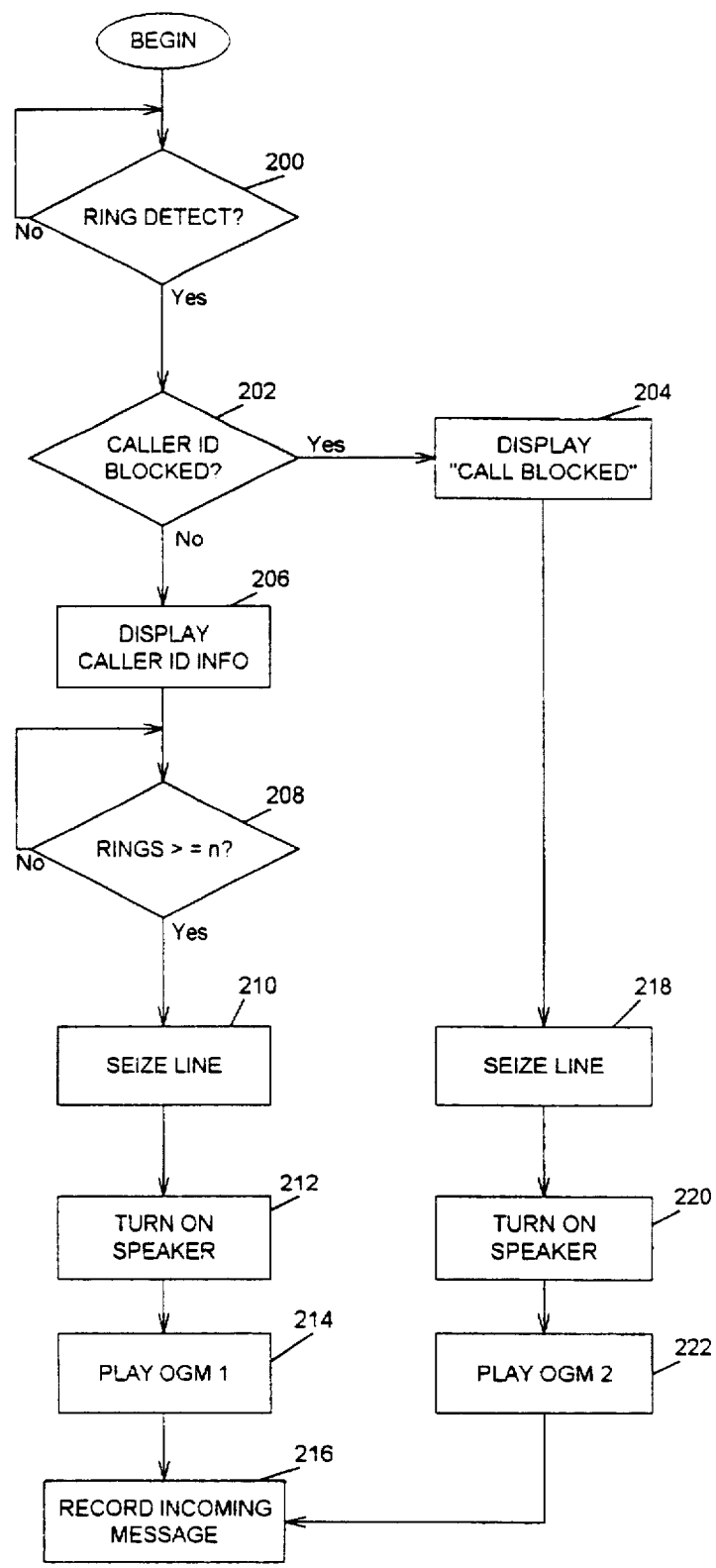
FIG. 4 is a flow diagram showing the procedure for handling telephone calls with blocked calling party identification information in accordance with a second arrangement of the present invention.

FIG. 4 is a flow diagram showing the procedure algorithm used by the controller of both embodiments for dealing with incoming telephone calls in accordance with a second arrangement of the present invention. In step 200, the controller (18 of FIG. 1 or 56 of FIG. 2) first checks to see if a ring has been detected by the ring detector (20 of FIG. 1 or 64 of FIG. 2). If a ring has not been detected (No in step 200), the controller returns to step 200 and continues to check for incoming ringing signals. If a ring has been detected (Yes in step 200), the controller checks the calling party identification detector (8 of FIG. 1 or 54 of FIG. 2) to see if the CPID information is blocked (step 202). If the CPID information is blocked (Yes in step 202), the words "CALL BLOCKED" are displayed on the display (step 204). The TAD then seizes the telephone line (step 218), turns on the speaker (step 220), plays the second (or special) outgoing message (OGM 2) to the telephone line (step 222) and records the caller's incoming message (step 216). After the TAD seizes the telephone line is step 218, the operation of the TAD is conventional, except that the second (or special) outgoing message (OGM 2) is played.

If the CPID information is not blocked (No in step 202), the caller's CPID information is displayed on the display (step 206) and the controller checks the ring detector to see if the number of rings received is equal to or greater than a predetermined number "n"(step 208). If the number of rings received is less than the predetermined number "n"(No in step 208), the controller returns to step 208 and continues to monitor the ring detector. When the number of rings received is equal to or greater than the predetermined number "n"(Yes in step 208), the TAD seizes the telephone line (step 210), turns on the speaker (step 212), plays the first (or regular) outgoing message (OGM 1) to the telephone line (step 214) and records the caller's incoming message (step 216).

Preferably, the second outgoing message (OGM 2) is recordable by a user. The recording of the second outgoing message may be done in a conventional manner as in a conventional TAD. Preferably, the first outgoing message (OGM 1) is also recordable by a user, in a conventional manner. However, one or both of the outgoing messages (OGM 1 and/or OGM 2) may be pre-recorded. Even if the OGM's are pre-recorded, the user may have the option of recording the user's OGM's.

Having described specific preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as defined in the appended claims.

What is claimed is:

1. A telephone answering device comprising:

a line interface for connecting the telephone answering device to a telephone line;

a ring detector coupled to the telephone line for detecting ringing signals sent from a telephone company central office;

a calling party identification detector, coupled to the telephone line, for detecting calling party identification information; and a controller, coupled to the line interface, to the ring detector and to the calling party identification detector for controlling the line interface to seize the telephone line and to answer an incoming call after the ring detector detects a first predetermined number of rings on the telephone line and immediately after the calling party identification detector detects that the calling party identification information has been blocked, and to answer an incoming call when the ring detector detects a second predetermined number of rings on the telephone line and the calling party identification detector detects that the calling party identification information has not been blocked.

2. The telephone answering device of claim 1, wherein after the ring detector detects a first ring on the telephone line, the line interface seizes the telephone line immediately after the calling party identification detector detects that the calling party information has been blocked.

3. The telephone answering device of claim 1, wherein:
   after the ring detector detects a first ring on the telephone line, the line interface is caused to seize the telephone line immediately after the calling party identification detector detects that the calling party identification information is blocked; and
   when the calling party identification detector detects that the calling party identification information is not blocked, the line interface does not seize the telephone line until the ring detector detects a number of rings on the telephone line which is greater than said at least a first ring.

4. The telephone answering device of claim 3, wherein the line interface seizes the telephone line after a predetermined number of rings occurs with no answer when the calling party identification detector detects that the calling party identification information is not blocked.

5. The telephone answering device of claim 1, further comprising a message recording and playback unit, coupled to the line interface and to the controller, for recording and playing back at least a message from a caller.

6. The telephone answering device of claim 5, wherein the message recording and playback unit plays a first outgoing message to the telephone line when the calling party identification detector detects that the calling party identification information has not been blocked, and plays a second outgoing message to the telephone line when the calling party identification detector detects that the calling party identification information has been blocked.

7. The telephone answering device of claim 6, wherein at least the first outgoing message is recordable by a user.

8. The telephone answering device of claim 6, wherein at least the second outgoing message is pre-recorded.

9. The telephone answering device of claim 5, wherein the message recording and playback unit comprises a tape recorder unit.

10. The telephone answering device of claim 5, wherein the message recording and playback unit comprises:
    a speech digitizer, coupled to the line interface and to the controller, for digitizing at least a message of a caller; and
    a memory, coupled to the controller, for storing the digitized message of a caller.

11. The telephone answering device of claim 10, wherein the memory comprises a random access memory.

12. The telephone answering device of claim 1, further comprising a display, coupled to the controller, for displaying at least calling party identification information.

13. The telephone answering device of claim 12, wherein the display comprises a liquid crystal display.

14. A telephone answering device comprising:
    a line interface for connecting the telephone answering device to a telephone line;
    a ring detector coupled to the telephone line for detecting ringing signals sent from a telephone company central office;
    a calling party identification detector, coupled to the telephone line, for detecting calling party identification information;
    a controller, coupled to the line interface, to the ring detector and to the calling party identification detector for controlling the line interface to seize the telephone line and to answer an incoming call when the ring detector detects a first predetermined number of rings on the telephone line and the calling party identification detector detects that the calling party identification information has been blocked, and to answer an incoming call when the ring detector detects a second predetermined number of rings on the telephone line and the calling party identification detector detects that the calling party identification information has not been blocked; and
    a message recording and playback unit, coupled to the line interface and to the controller, for recording and playing back at least a message from a caller;
    wherein the message recording and playback unit plays a first outgoing message to the telephone line when the calling party identification detector detects that the calling party identification information has not been blocked, and plays a second outgoing message to the telephone line when the calling party identification detector detects that the calling party identification information has been blocked.

15. The telephone answering device of claim 14, wherein at least the second outgoing message is recordable by a user.

16. The telephone answering device of claim 14, wherein at least the second outgoing message is pre-recorded.

17. The telephone answering device of claim 14, wherein the message recording and playback unit comprises a tape recorder unit.

18. The telephone answering device of claim 14, wherein the message recording and playback unit comprises:
    a speech digitizer, coupled to the line interface and to the controller, for digitizing at least a message of a caller; and
    a memory, coupled to the controller, for storing the digitized message of a caller.

19. The telephone answering device of claim 18, wherein the memory comprises a random access memory.

* * * * *